Oct. 27, 1970    S. FROWDE    3,535,740

APPARATUS FOR PRODUCING EMBOSSED THERMOPLASTIC SHEET

Filed Nov. 22, 1967

INVENTOR
STANLEY CHARLES FROWDE

By
Cushman, Darby & Cushman
ATTORNEYS

United States Patent Office 3,535,740
Patented Oct. 27, 1970

3,535,740
APPARATUS FOR PRODUCING EMBOSSED
THERMOPLASTIC SHEET
Stanley Charles Frowde, Hyde, England, assignor to Imperial Chemical Industries Limited, London, England, a corporation of Great Britain
Filed Nov. 22, 1967, Ser. No. 685,082
Claims priority, application Great Britain, Nov. 25, 1966, 52,825/66
Int. Cl. B29c 17/00
U.S. Cl. 18—19    10 Claims

ABSTRACT OF THE DISCLOSURE

Embossing apparatus comprises a chamber divided by a flexible diaphragm into a lower chamber and an upper chamber having a heated upper wall. In operation a thermo-plastic sheet to be embossed is placed on the diaphragm and an embossing sheet having a pattern on its lower face is placed on the plastic sheet. Both compartments are then evacuated following which air is admitted to the lower compartment so as to move the diaphragm upwardly to press the plastic sheet between the diaphragm and the heated upper wall of the upper chamber.

---

Figure 1:
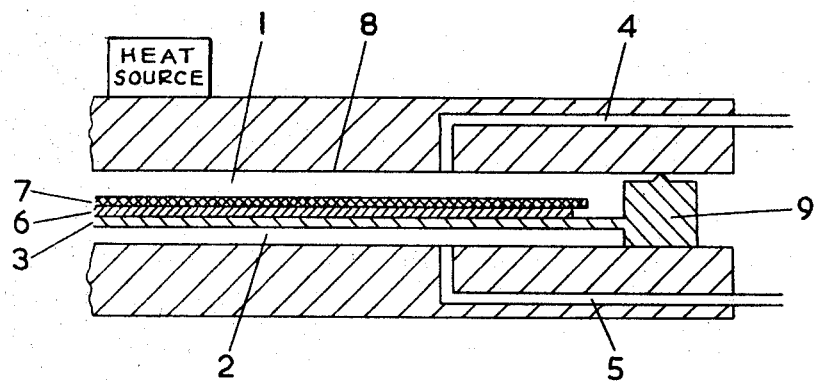

This invention relates to a method of providing a thermoplastic sheet with an embossed pattern. The method proposed is particularly suitable for providing embossed patterns in the form of a multiplicity of closely spaced protuberances, for example a suede-like material. It is, however, suitable for providing a variety of other embossed patterns as are now required in the art. It is also suitable for forming thermoplastic sheet to a desired non-planar contour, the sheet simultaneously being provided with an embossed pattern.

Embossing surfaces used for producing an embossed pattern on a thermoplastic sheet have a surface pattern which is the reverse of that required on the sheet. When the embossing surface is brought into contact with the surface of the thermoplastic sheet, with appropriate conditions of heat and pressure, the surface of the sheet is moulded to conform to the pattern on the embossing surface; the hills and valleys of the embossing surface becoming the valleys and hills respectively in the moulded sheet.

In one method used to provide a thermoplastic coated fabric with an embossed pattern, the embossing medium and the thermoplastic sheet are arranged in a superimposed manner between the platens of a press. When the embossing surface on the embossing medium is one having fine detail, for example a suede-like pattern, relatively high pressures are required in the press to achieve adequate reproduction of the surface pattern. Though good reproduction can be achieved there is considerable penetration of the thermoplastic coating through the fabric which is deleterious to the product.

To avoid this difficulty the embossing operation has been achieved satisfactorily by a vacuum embossing technique the thermoplastic coating being brought into intimate contact with a porous embossing medium by applying suction through the pores in the embossing surface. Such embossing surfaces are, however, very difficult to produce particularly when the pattern is in the form of a multiplicity of closely spaced depressions.

The present invention is concerned with a method by means of which an unsupported or supported thermoplastic sheet can be provided with a grained pattern or other surface configuration.

According to the present invention we provide a method for the production of an embossed thermoplastic sheet which comprises, (i) arranging the sheet to face the embossing surface of a non-porous embossing medium,
(ii) applying suction to the space between the sheet and the embossing surface so that air is evacuated therefrom,
(iii) forcing the sheet into intimate contact with the embossing surface by applying pressure either on the sheet or the embossing medium,
(iv) applying heat to the thermoplastic sheet so that its surface is rendered plastic and becomes moulded in conformity with the embossing surface, and
(v) removing the embossed sheet so formed from the embossing surface.

In a preferred embodiment of the method either the sheet or the embossing surface provide a diaphragm or a separate diaphragm is provided, in (ii) above suction being applied to both sides of the diaphragm and in (iii) above the required pressure being created by maintaining the suction on one side of the diaphragm only so that an air pressure differential is created across the diaphragm.

Heating may be applied directly to the thermoplastic sheet. Furthermore the thermoplastic sheet may be heated before being forced into intimate contact with the embossing surface.

In an alternative and preferred embodiment of this invention heat is applied to the embossing medium, the thermoplastic sheet being heated by conduction from the medium. In this way heat is conveniently applied to the thermoplastic sheet where it is most needed, i.e. at the surface to be embossed. The temperature to which the embossing surface will have to be heated is, of course, dependent on the temperature to which the sheet will have to be heated to render it plastic. With the usual thermoplastic materials employed in the art, examples of which are vinyl polymers and copolymers, it will be necessary for the embossing surface to be heated to a temperature in the range 80° to 250° C.

In a preferred form of this embodiment the embossing surface and a heat source are initially spaced apart, heating of the medium being achieved by moving them into close proximity. Conveniently heating is achieved by moving the embossing medium, with the thermoplastic sheet in contact with it, into contact with this heat source in which case heat is conducted from the source to the embossing surface. In another form of our invention the embossing medium is maintained in permanent contact with the heat source. In preference, however, the embossing medium is moved away from the influence of the heat source before the embossed sheet is removed from the embossing surface while the latter is still at an elevated temperature or after the latter has been allowed to cool down.

Heating of the sheet and/or medium may be achieved by some technique other than conduction, for example electronically or by radiant heating.

The embossing surface may be constructed from any suitable materials, examples of which are metals, silicone elastomers and glass. It may be provided with any desired surface pattern and also its overall contour may be non-planar in order that the thermoplastic sheet may be moulded to some required shape.

The thermoplastic sheet used with the invention may be unsupported or alternatively it may be provided with a supporting substrate. The thermoplastic sheet may comprise two or more dissimilar layers of thermoplastic material, for example one layer, a visible outer layer, may be solid and another layer, an inner layer, may be cellular. It will be understood that the solid outer thermoplastic layer will be adjacent to the embossing surface in use of our invention.

Figure 2:
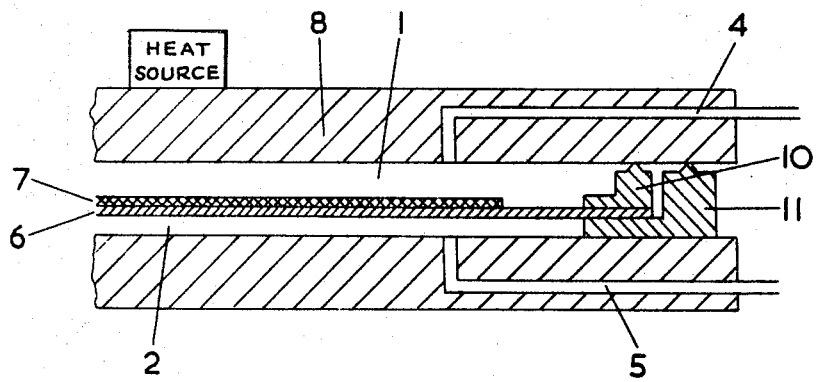

Though the method of the present invention may be performed in any suitable manner it has been found that it may be satisfactorily performed using the apparatus which is described hereinafter with reference to the accompanying drawings in which:

FIG. 1 shows, in diagrammatic section, a portion of one form of the apparatus, and FIG. 2 shows, in diagrammatic section, a portion of a modified apparatus.

The apparatus shown in FIG. 1 consists of an air tight chamber which is divided into two separate shallow compartments (1, 2) by a flexible diaphragm 3, provided with marginal gasket portions 9, each compartment being provided with means for reducing or increasing the pressure within the compartment to below or above atmospheric pressure via pipelines 4 and 5. The compartments are shallow so as to reduce the volume of air required to be evacuated and additionally the walls of the compartments facing the sheet/medium assembly can be used to support the assembly when the pressure differential is applied. In compartment 1, herein termed the embossing compartment, and connected to a pressure controlling device by pipeline 4, are located a thermoplastic sheet 6, an embossing medium 7 and a hot surface 8 which serves as the heat source. The hot surface constitutes one wall of the embossing compartment.

The other compartment 2 connected to the pipeline 5, may be provided with a further source of heat (not shown).

The diaphragm 3 may be a metallic sheet, a sheet of a silicone elastomer, a plastic sheet or any other sheet made from a material having the required properties.

As a preliminary operation air is evacuated simultaneously from both compartments so that no movement of the flexible diaphragm occurs. In the embossing compartment 1 the general reduction of pressure will remove air from the interface between the embossing surface of the embossing medium and the thermoplastic sheet.

At this stage air, at atmospheric or higher pressure, is admitted through pipeline 5 into the compartment 2 which does not incorporate the embossing surface. This creates a difference of pressure across the diaphragm which is sufficient to cause central portions of the diaphragm to move relative to fixed marginal portions in a direction towards the hot surface 8. The diaphragm serves to force the thermoplastic sheet and the embossing surface into intimate contact. It further serves to move the embossing medium into contact with the hot surface.

Heat is conducted from the hot surface to the embossing surface which in turn renders the surface of the thermoplastic sheet plastic and this is moulded to conform to the embossing surface.

Subsequently air, at atmospheric or higher pressure, is admitted through pipeline 4 into the embossing compartment so that the pressures on both sides of the diaphragm are again the same. The diaphragm returns to its rest position thus allowing the embossing medium and the thermoplastic sheet material to move away from the hot surface.

Finally the embossed sheet is stripped from the embossing surface either while it is hot or after it has been allowed to cool down.

In the apparatus the diaphragm in its rest position and the hot surface both lie in substantially horizontal planes, the embossing compartment being located above the diaphragm. In this case, after the embossing operation has been achieved, movement of the embossing medium away from the hot surface is assisted by gravity.

Typically the diaphragm was a flexible sheet of a silicone elastomer and the hot surface, which was metallic, was maintained at a temperature of 200° C. The means provided to reduce the air pressure in both the compartments was a vacuum pump which was capable of reducing the pressure to 5 mms. of mercury or lower. The embossing medium was a sheet of a silicone elastomer having a surface pattern consisting of a multiplicity of surface indentations having a depth in excess of 0.002 inch and a surface density in excess of 400 indentations per square inch. A satisfactory emboss was provided on a polyvinyl chloride coated fabric by maintaining the embossing medium in contact with the hot surface for approximately one minute while a differential pressure of approximately atmospheric pressure was maintained across the diaphragm.

After the embossing medium was moved out of contact with the hot surface, the embossing surface was allowed to cool down before the embossed sheet was removed from it.

In a modification of the apparatus shown in FIG. 1 the diaphragm itself may be provided with an embossed patterned surface which may serve as the embossing surface dispensing with the necessity of embossing medium 7. Alternatively the embossed diaphragm may serve as a second embossing surface so that an embossed design may be produced on both sides of the thermoplastic sheet material.

The apparatus shown in FIG. 2 is essentially the same as that shown in FIG. 1 except that the thermoplastic sheet 6 itself serves as a flexible diaphragm, dividing the air tight chamber into its two compartments (1, 2). Gaskets (10, 11) provided on opposed sides of the thermoplastic sheet prevent air passing from one compartment to the other. As before the embossing medium 7 is laid on top of the thermoplastic sheet with the embossing surface and thermoplastic sheet being in contact.

With this modified apparatus an embossing operation may be carried out in a similar manner as described previously.

Hitherto, using a cold embossing surface and hot thermoplastic sheet, it has been found that deep grained patterns could not be produced satisfactorily because of insufficient penetration of the plastics material into the recessed portions of the mould. By the method of the present invention deep grained designs can be produced. Further in view of the relatively light pressures involved it is possible to emboss a plastic coated fabric without excessive penetration of the fabric. Furthermore when the thermoplastic coating contains a cellular layer the use of light pressures is significant in preventing collapse of the cellular structure.

What we claim is:

1. Apparatus for providing a thermoplastic sheet with an embossed pattern comprising: walls defining an airtight chamber; a horizontal imperforate flexible diaphragm dividing the chamber into an upper embossing compartment and a lower compartment; a non-porous embossing medium in said embossing compartment and supported on said diaphragm whereby a thermoplastic sheet to be embossed may be interposed therebetween; heating means in said embossing compartment spaced above said embossing medium; and means for forcing the thermoplastic sheet and said embossing medium into intimate contact with said embossing medium and for moving central portions of said diaphragm and said embossing medium toward said heating means, said forcing and moving means including separate means associated with each compartment for reducing and subsequently restoring the air pressure within the respective compartment so that after reducing the pressure in the two compartments to effect intimate contact between said embossing medium and the thermoplastic sheet a pressure differential can be established across opposite sides of said diaphragm to effect movement of the diaphragm toward said heating means.

2. Apparatus for providing a thermoplastic sheet with an embossed pattern comprising:

walls defining an airtight chamber;

a flexible and imperforate diaphragm for receiving the thermoplastic sheet thereon and for completely dividing the chamber into an embossing compartment and another compartment;

a non-porous embossing medium for at least partially covering the thermoplastic sheet in said embossing compartment;

a heat source operatively located to heat the wall of said embossing compartment whereby said wall provides a solid heating surface; and means for forcing the thermoplastic sheet into intimate contact with said embossing means and for moving central portions of said diaphragm and said embossing medium toward said heating surface, said forcing and moving means including separate means associated with each compartment for selectively reducing the air pressure within the respective compartment means and for thereafter establishing a pressure differential across opposite sides of said diaphragm for causing central portions of the diaphragm to move relative to marginal portions thereof to force the thermoplastic sheet and the embossing medium into intimate contact and for forcing the embossing medium into contact with said solid heating surface.

3. Apparatus as claimed in claim 2 in which the means for reducing and restoring the air pressure within the two compartments are adapted to provide the following sequence of operations;
  (i) evacuation of air from both compartments,
  (ii) introduction of air into the other, non-embossing, compartment so that a pressure differential is established on opposed sides of the diaphragm, and
  (iii) introduction of air into the embossing compartment so that the air pressure on opposed sides of the diaphragm is equalised.

4. Apparatus as claimed in claim 2 in which the compartments are shallow, the walls of the compartments facing the assembly of the sheet and the embossing medium serving as a support for the assembly when a pressure differential is applied across the diaphragm.

5. Apparatus as claimed in claim 4 in which a wall of of the embossing compartment serves as a hot surface for supporting the embossing medium when the pressure differential is applied.

6. Apparatus as claimed in claim 2 in which the flexible diaphragm is a sheet of silicone elastomer.

7. Apparatus as claimed in claim 2 in which the surface of the flexible diaphragm which is located in the embossing compartment is provided with an embossed pattern so that it can also serve as the non-porous embossing medium.

8. Apparatus as claimed in claim 2 in which the embossing compartment is located above the flexible diaphragm, the diaphragm serving as a support for the thermoplastic sheet and the embossing medium which are laid in a superimposed manner, one above the other, on the diaphragm.

9. Apparatus as claimed in claim 8 in which the thermoplastic sheet is sandwiched between the diaphragm and the embossing medium the differential pressure which can be established on opposed sides of the diaphragm causing movement of the embossing medium into abutment with a wall of the embossing compartment which prevents further movement, the thermoplastic sheet being compressed between the embossing medium and the diaphragm.

10. Apparatus as claimed in claim 8 in which the surface of the diaphragm which is located in the embossing compartment is provided with an embossed pattern, the diaphragm serving to provide an embossed pattern on the surface of the thermoplastic sheet remote from the embossing medium.

References Cited
UNITED STATES PATENTS

| | | | |
|---|---|---|---|
| 1,209,308 | 12/1916 | Lanhoffer | 18—19 |
| 1,737,874 | 12/1929 | Busch. | |
| 2,160,182 | 5/1939 | Vrooman | 18—19 |
| 2,331,296 | 10/1943 | Bendex | 18—19 XR |
| 2,362,672 | 11/1944 | Sloan | 18—19 |
| 2,367,779 | 1/1945 | Hull | 18—19 |
| 2,493,439 | 1/1950 | Braund | 18—19 XR |
| 2,975,476 | 3/1961 | Burke. | |

J. SPENCER OVERHOLSER, Primary Examiner